United States Patent
Shiraki et al.

(10) Patent No.: US 11,342,572 B2
(45) Date of Patent: May 24, 2022

(54) REDOX FLOW BATTERY

(71) Applicant: SUMITOMO ELECTRIC INDUSTRIES, LTD., Osaka (JP)

(72) Inventors: Kousuke Shiraki, Osaka (JP); Takashi Kanno, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 51 days.

(21) Appl. No.: 16/633,379

(22) PCT Filed: Aug. 9, 2017

(86) PCT No.: PCT/JP2017/028897
§ 371 (c)(1),
(2) Date: Jan. 23, 2020

(87) PCT Pub. No.: WO2019/030844
PCT Pub. Date: Feb. 14, 2019

(65) Prior Publication Data
US 2021/0159532 A1    May 27, 2021

(51) Int. Cl.
*H01M 8/18*    (2006.01)
*H01M 4/96*    (2006.01)

(52) U.S. Cl.
CPC ............ *H01M 8/188* (2013.01); *H01M 4/96* (2013.01); *H01M 8/18* (2013.01); *Y02E 60/50* (2013.01)

(58) Field of Classification Search
None
See application file for complete search history.

(56) References Cited

U.S. PATENT DOCUMENTS

| 5,759,711 | A | * | 6/1998 | Miyabayashi | ...... H01M 8/0289 |
| | | | | | 429/51 |
| 6,509,119 | B1 | * | 1/2003 | Kobayashi | .............. C01B 32/20 |
| | | | | | 429/231.8 |
| 2004/0241544 | A1 | | 12/2004 | Nakaishi et al. | |

(Continued)

FOREIGN PATENT DOCUMENTS

| CN | 106532069 A | 3/2017 |
| JP | H08-138685 A | 5/1996 |

(Continued)

OTHER PUBLICATIONS

English machine translation of Bai et al. (CN 106532069 A), accessed online from Espacenet, PDF pp. 1-14. (Year: 2017).*

(Continued)

*Primary Examiner* — Katie L. Hammer
(74) *Attorney, Agent, or Firm* — Oliff PLC

(57) ABSTRACT

A redox flow battery includes: a membrane; and electrodes that are disposed in a compressed state on both sides of the membrane and sandwich the membrane. The thickness x (μm) of the membrane and the compression ratio y (%) of the electrodes satisfy the following relation A or B: (A) when the electrodes are formed from carbon felt, $y<x+60$, $30 \leq y \leq 85$, and $5 \leq x \leq 60$ hold; (B) when the electrodes are formed from carbon cloth or carbon paper, $y<1.2x+42$, $10 \leq y \leq 85$, and $5 \leq x \leq 60$ hold, where $y=\{1-(\text{the thickness during compression/the thickness before compression})\} \times 100$.

6 Claims, 5 Drawing Sheets

(56) References Cited

U.S. PATENT DOCUMENTS

| | | | | |
|---|---|---|---|---|
| 2014/0302423 A1* | 10/2014 | Darling | ............ | H01M 8/04186 |
| | | | | 429/498 |
| 2016/0036060 A1 | 2/2016 | Brezovec et al. | | |
| 2016/0260988 A1* | 9/2016 | Miyazawa | .......... | H01M 8/1039 |
| 2017/0059520 A1* | 3/2017 | Yang | ................. | H01M 8/188 |
| 2017/0207475 A1 | 7/2017 | Ito | | |
| 2018/0331373 A1* | 11/2018 | Byun | ................. | H01M 8/188 |
| 2019/0097241 A1* | 3/2019 | Weber | ................. | H01M 8/188 |

FOREIGN PATENT DOCUMENTS

| | | | |
|---|---|---|---|
| JP | 2001-85026 A | 3/2001 | |
| JP | 2005-158383 A | 6/2005 | |
| JP | 2014-130778 A | 7/2014 | |
| JP | 2015-521787 A | 7/2015 | |
| JP | 2016-85900 A | 5/2016 | |
| JP | 2017-27830 A | 2/2017 | |
| JP | 2017-82268 A | 5/2017 | |
| WO | 02/101863 A1 | 12/2002 | |
| WO | 2013/095380 A1 | 6/2013 | |
| WO | 2014/001787 A1 | 1/2014 | |

OTHER PUBLICATIONS

Product Information; "Dupont nation PFSA membranes NRE-211 and NRE-212 perfluorosulfonic acid polymer;" Fuel Cell Markets Ltd. [online]; Feb. 2004; pp. 1-6; retrieved Nov. 15, 2017; <http://www.fuelcellmarkets.com/content/images/articles/nae201.pdf>.

* cited by examiner

REDOX FLOW BATTERY

TECHNICAL FIELD

The present invention relates to a redox flow battery.

BACKGROUND ART

One known large capacity storage battery that stores electric power from natural energy generated by solar photovoltaic power generation, wind power generation, etc. is a redox flow battery (RF battery) in PTL 1. The RF battery in PTL 1 includes positive and negative electrodes formed from graphite felt, a membrane interposed between these electrodes, and intermediate films that are disposed on surfaces of the membrane and allow hydrogen ions to pass therethrough.

CITATION LIST

Patent Literature

PTL 1: Japanese Unexamined Patent Application Publication No. 2005-158383

SUMMARY OF INVENTION

The redox flow battery according to the present disclosure includes:
a membrane; and
electrodes that are disposed in a compressed state on both sides of the membrane and sandwich the membrane,
wherein a thickness x (μm) of the membrane and a compression ratio y (%) of the electrodes satisfy the following relation A or B:
(A) when the electrodes are formed from carbon felt, $y < x+60$, $30 \leq y \leq 85$, and $5 \leq x \leq 60$ hold;
(B) when the electrodes are formed from carbon cloth or carbon paper, $y < 1.2x+42$, $10 \leq y \leq 85$, and $5 \leq x \leq 60$ hold,
where $y = \{1-(\text{the thickness during compression/the thickness before compression})\} \times 100$.

DESCRIPTION OF EMBODIMENTS

Figure 1:
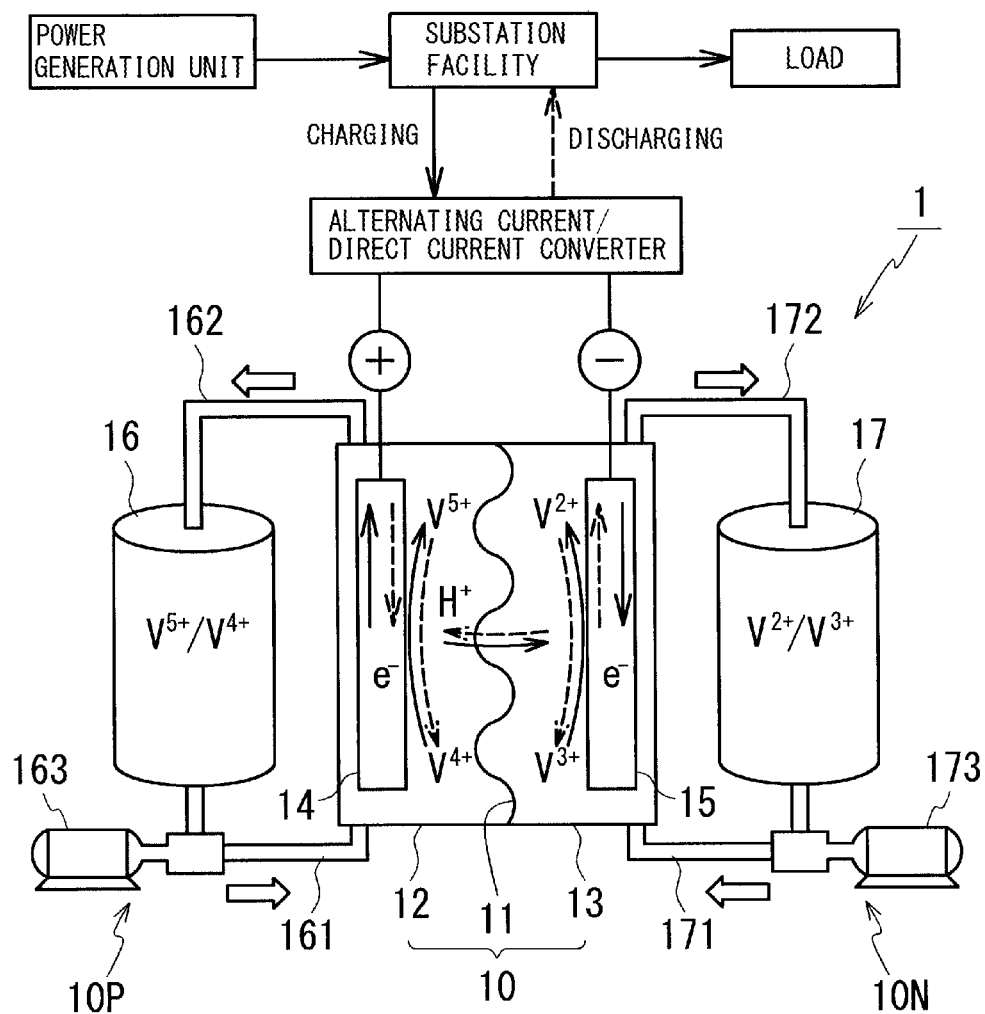
FIG. 1 is an operating principle diagram of a redox flow battery according to an embodiment.

[Problems to be Solved by Present Disclosure]

When the intermediate films are provided as described above, direct contact between the electrodes and the membrane can be easily prevented, so that damage such as breakage (puncture) caused by contact (piercing) with the electrodes can be easily prevented even when the membrane is thin. However, it is necessary to provide additional members, e.g., protective members for the membrane such as the intermediate films. This may cause an increase in internal resistance and a reduction in productivity.

Accordingly, it is an object to provide a redox flow battery in which a thin membrane is unlikely to be damaged without providing additional members.

[Advantageous Effects of Present Disclosure]

In the present disclosure, the thin membrane is unlikely to be damaged without providing additional members.

<<Description of Embodiments of Present Invention>>

The present inventors have conducted extensive studies on how to prevent damage to the membrane caused by contact with the electrodes such as piercing with the electrodes and found that the damage to the membrane can be prevented when the thickness of the membrane and the compression ratio of the electrodes satisfy a specific relation. The present invention is based on this finding. First, embodiments of the present invention will be enumerated and described.

(1) A redox flow battery according to an embodiment of the present invention includes:
a membrane; and
electrodes that are disposed in a compressed state on both sides of the membrane and sandwich the membrane,
wherein a thickness x (μm) of the membrane and a compression ratio y (%) of the electrodes satisfy the following relation A or B:
(A) when the electrodes are formed from carbon felt, $y < x+60$, $30 \leq y \leq 85$, and $5 \leq x \leq 60$ hold;
(B) when the electrodes are formed from carbon cloth or carbon paper, $y < 1.2x+42$, $10 \leq y \leq 85$, and $5 \leq x \leq 60$ hold,
where $y = \{1-(\text{the thickness during compression/the thickness before compression})\} \times 100$.

With the above structure, the thin membrane is unlikely to be damaged without providing additional members. This is because, when any of the above relations holds, an excessive repulsive force of the compressed electrodes does not act on the membrane and contact (piercing) of the membrane with the electrodes can be easily prevented.

Since the thickness x of the membrane is 5 μm or more, the membrane is not excessively thin, and the damage to the membrane caused by contact with the electrodes can be easily prevented. Moreover, the membrane can be easily produced and handled with ease. Since the thickness x of the membrane is 60 μm or less, the membrane is thin, and the internal resistance of the battery can be easily reduced.

Since the lower limit of the compression ratio y is equal to or more than the specified value, the compression ratio is high, and the electrical conductivity of the electrodes can be increased. Therefore, a cell resistivity can be easily reduced. Since the compression ratio y is 85 or less, the electrodes are not compressed excessively, so that the damage to the membrane due to the repulsive force of the electrodes can be easily prevented.

(2) In one aspect of the redox flow battery,
the electrodes may be formed from carbon felt, and
the thickness x (μm) of the membrane may satisfy $x \leq 50$.

In this structure, since the thickness of the membrane is smaller, the internal resistance of the battery can be easily reduced.

(3) In one aspect of the redox flow battery including the electrodes formed from carbon felt, the compression ratio y (%) of the electrodes may satisfy 40≤y.

In this structure, since the compression ratio is higher, the electrical conductivity of the electrodes can be increased. Therefore, the cell resistivity can be easily reduced.

(4) In one aspect of the redox flow battery, the electrodes may be formed from carbon cloth or carbon paper, and the thickness x (µm) of the membrane may satisfy x≤50.

In this structure, since the thickness of the membrane is smaller, the internal resistance of the battery can be easily reduced.

(5) In one aspect of the redox flow battery including the electrodes formed from carbon cloth or carbon paper, the compression ratio y (%) of the electrodes may satisfy 20≤y.

In this structure, since the compression ratio is higher, the electrical conductivity of the electrodes can be increased. Therefore, the cell resistivity can be easily reduced.

(6) In one aspect of the redox flow battery, the electrodes may have a specific gravity of 0.02 g/cm$^3$ or more and 0.5 g/cm$^3$ or less.

When the specific gravity of the electrodes is 0.02 g/cm$^3$ or more, the amount of an electrically conductive component is large, and therefore the internal resistance of the battery can be easily reduced. When the specific gravity of the electrodes is 0.5 g/cm$^3$ or less, the repulsive force of the electrodes is not excessively high, so that the damage to the membrane can be easily prevented.

<<Details of Embodiments of Present Invention>>

Figure 2:
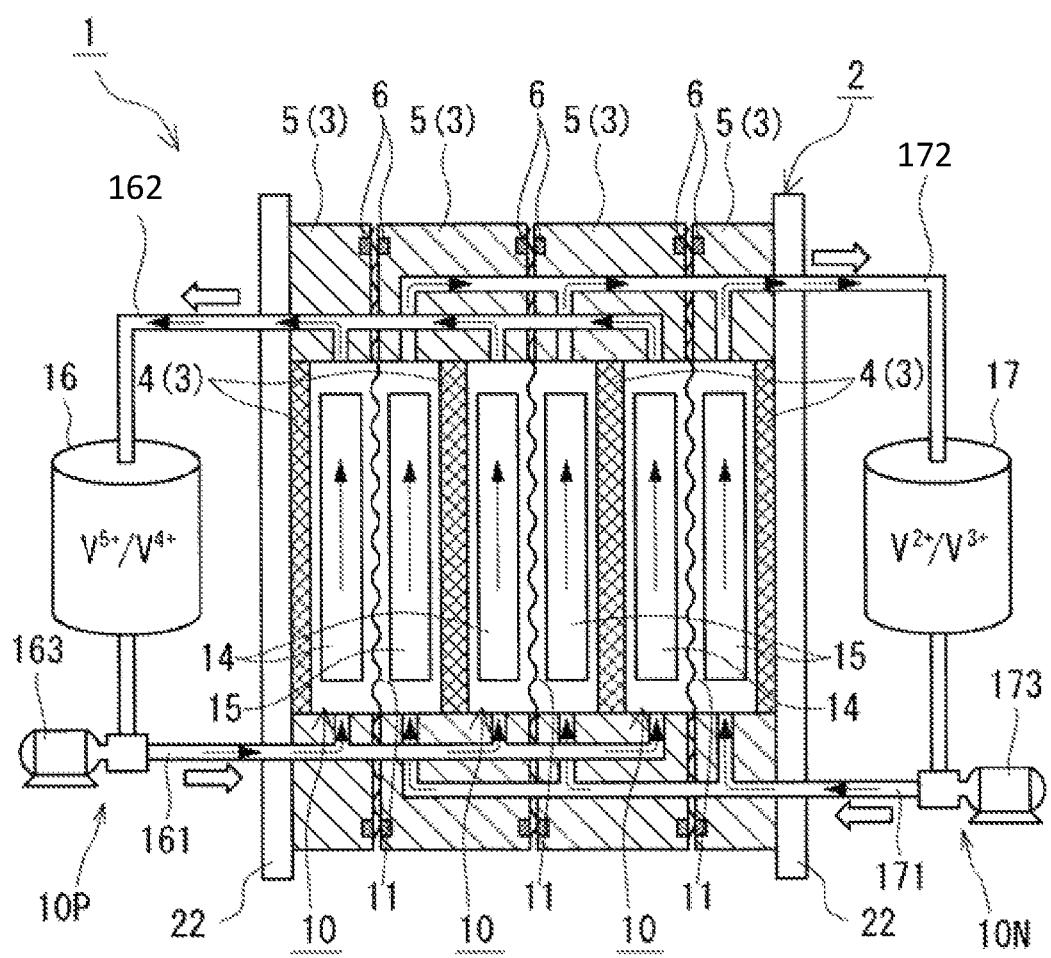
FIG. 2 is a schematic illustration showing the structure of the redox flow battery according to the embodiment.
Figure 3:
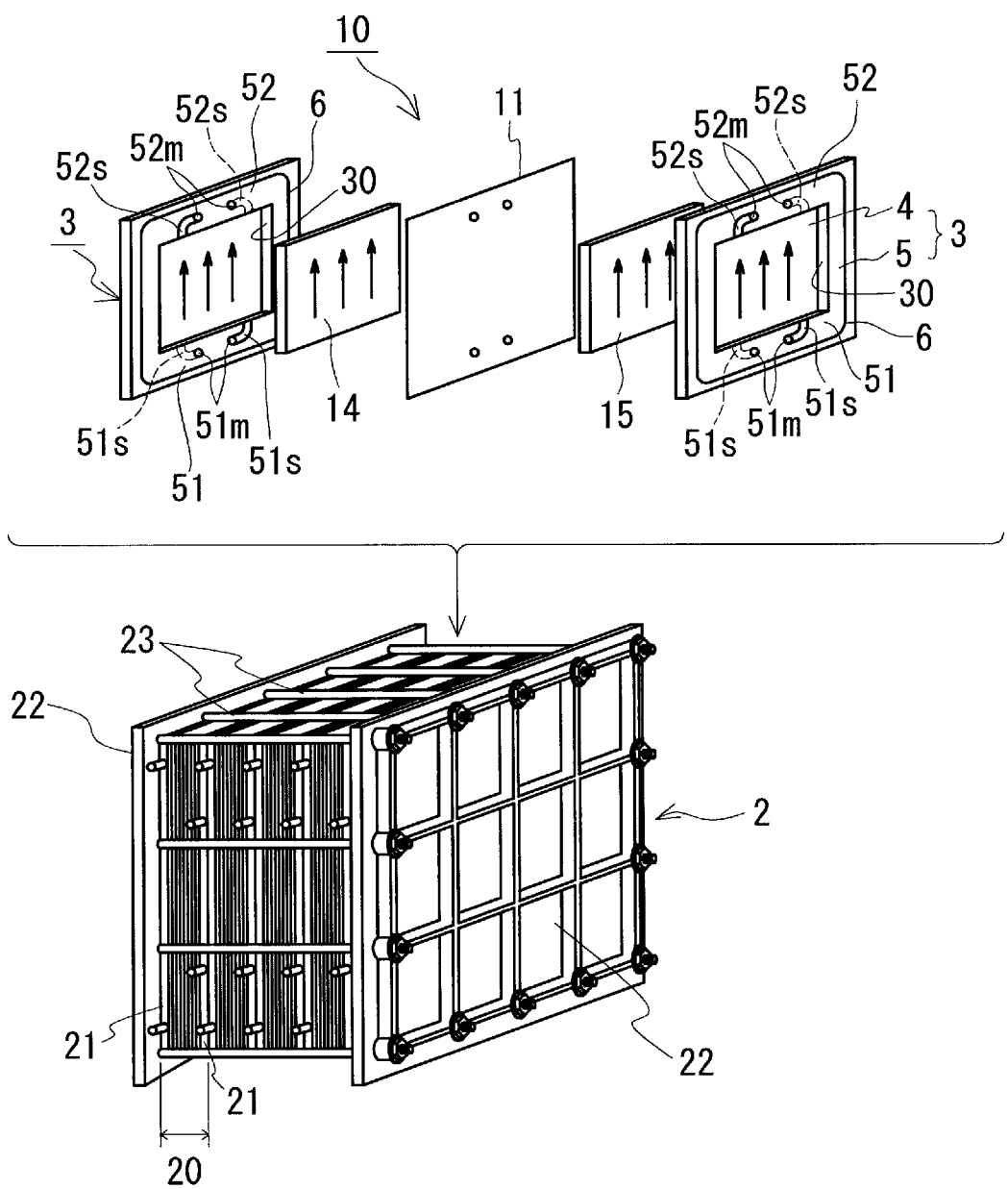
FIG. 3 is a schematic illustration showing a cell stack included in the redox flow battery according to the embodiment.

Details of embodiments of the present invention will be described with reference to the drawings. However, the present invention is not limited to these exemplary embodiments. The present invention is defined by the scope of the claims and is intended to include any modifications within the scope and meaning equivalent to the scope of the claims. Referring first to FIGS. 1 to 3, the outline and basic structure of a redox flow battery (RF battery) 1 according to an embodiment will be described, and then components of an RF battery according to embodiment 1 will be described in detail with reference to FIGS. 1 to 5.

[Outline of RF Battery]

Typically, as shown in FIG. 1, the RF battery 1 is connected to a power generation unit (such as a solar photovoltaic power generator, a wind power generator, or a general power station) and a load (such as a consumer) through an alternating current/direct current converter, charged to store the electric power generated by the power generation unit, and discharged to supply the stored electric power. The charging and discharging are performed using positive and negative electrolytes containing, as active materials, metal ions whose valence is changed by oxidation/reduction and utilizing the difference in oxidation-reduction potential between the ions contained in the positive electrolyte and the ions contained in the negative electrolyte. In FIG. 1, vanadium ions are exemplified as the ions contained in the electrolytes. Solid arrows represent charging, and broken arrows represent discharging. The RF battery 1 is used, for example, for load leveling applications, applications for compensation for momentary voltage drops and for emergency power sources etc., and output leveling applications for natural energy from solar photovoltaic power generation and wind power generation that are being introduced widely.

[Basic Structure of RF Battery]

The RF battery 1 includes battery cells 10 each including a positive cell 12 and a negative cell 13 separated from each other by a membrane 11 that allows hydrogen ions to pass therethrough. A positive electrode 14 is installed in the positive cell 12, and the positive electrolyte is circulated through the positive cell 12 by a positive electrolyte circulation mechanism 10P. The positive electrolyte circulation mechanism 10P includes: a positive electrolyte tank 16 that stores the positive electrolyte; a supply pipe 161 and a discharge pipe 162 that connect the positive cell 12 and the positive electrolyte tank 16 to each other; and a pump 163 disposed at an intermediate point in the supply pipe 161. Similarly, a negative electrode 15 is installed in the negative cell 13, and the negative electrolyte is circulated through the negative cell 13 by a negative electrolyte circulation mechanism 10N. The negative electrolyte circulation mechanism 10N includes: a negative electrolyte tank 17 that stores the negative electrolyte; a supply pipe 171 and a discharge pipe 172 that connect the negative cell 13 and the negative electrolyte tank 17 to each other; and a pump 173 disposed at an intermediate point in the supply pipe 171. During charging/discharging operation, the positive and negative electrolytes are circulated through the positive and negative cells 12 and 14 by the pumps 163 and 173. Specifically, the electrolytes flow from the positive and negative electrolyte tanks 16 and 17 through the supply pipes 161 and 171, are supplied to the positive and negative cells 12 and 13, flow from the positive and negative cells 12 and 13 through the discharge pipes 162 and 172, and are discharged to the positive and negative electrolyte tanks 16 and 17. During standby without charging and discharging, the pumps 163 and 173 are stopped, and the positive and negative electrolytes are not circulated.

[Cell Stack]

Generally, the battery cells 10 are formed in a structure called a cell stack 2 shown in FIG. 2 and a lower part of FIG. 3. The cell stack 2 is formed by sandwiching layered bodies called substacks 20 (the lower part of FIG. 3) between two end plates 22 and fastening the end plates 22 by a fastening mechanism 23. In the example shown in the lower part of FIG. 3, a plurality of the substacks 20 are provided. As shown in FIG. 2 and an upper part of FIG. 3, each of the plurality of the substacks 20 includes a plurality of cell frames 3, a plurality of positive electrodes 14, a plurality of membranes 11, and a plurality of negative electrodes 15, and these are stacked sequentially in the order of cell frame 3/positive electrode 14/membrane 11/negative electrode 15. Supply/drainage plates 21 (the lower part of FIG. 3 (omitted in FIG. 2)) are disposed on both sides of each layered body.

[Cell Frames]

Each cell frame 3 includes a bipolar plate 4 and a frame body 5 that surrounds the outer circumferential edges of the bipolar plate 4, and surfaces of the bipolar plate 4 and an inner circumferential surface of the frame body 5 form recesses 30, the positive electrode 14 (or the negative electrode 15) being disposed in one of the recesses 30. One battery cell 10 is formed between the bipolar plates 4 of cell frames 3 adjacent to each other. The positive electrode 14 (the positive cell 12) of a battery cell 10 and the negative electrode 15 (the negative cell 13) of an adjacent battery cell 10 are disposed on the front and back sides of a bipolar plate 4.

The cell frames 3 include: intermediate cell frames each disposed between adjacent battery cells 10 in one of the layered bodies (FIGS. 1 to 3); and end cell frames disposed on opposite ends of the layered bodies. In each intermediate cell frame, the positive electrode 14 of one battery cell 10 and the negative electrode 15 of another battery cell 10 are in contact with the front and back sides, respectively, of the bipolar plate 4. In each end cell frame, one of the positive electrode 14 and the negative electrode 15 of a battery cell 10 is in contact with one surface of the bipolar plate 4, and no electrode is present on the other surface. The structures of the front and back (positive and negative electrode) sides of the cell frames 3 are the same for all the intermediate cell frames and the end cell frames.

Each frame body 5 supports the corresponding bipolar plate 4 and forms inner regions serving as battery cells 10. The frame body 5 has a rectangular frame shape, and each recess 30 has a rectangular opening shape. The frame body 5 includes: a liquid supply-side piece 51 (the lower side in the drawing sheet of FIG. 3) including liquid supply manifolds 51*m* and liquid supply slits 51*s* for supplying electrolytes to respective battery cells 10; and a liquid discharge-side piece 52 (the upper side in the drawing sheet of FIG. 3) facing the liquid supply-side piece 51 and including liquid discharge manifolds 52*m* and liquid discharge slits 52*s* for discharging the electrolytes to the outside of the battery cells 10. The direction in which the liquid supply-side piece 51 and the liquid discharge-side piece 52 of the cell frame 3 face each other in plan view is defined as a vertical direction, and the direction orthogonal to the vertical direction is defined as a horizontal direction. The liquid supply-side piece 51 is located on the lower side in the vertical direction, and the liquid discharge-side piece 52 is located on the upper side in the vertical direction. Specifically, the electrolytes flow in a direction from the lower side of the frame body 5 in the vertical direction toward the upper side in the vertical direction.

Liquid supply rectifying portions (not shown) may be formed at an inner circumferential edge of the liquid supply-side piece 51 and used to diffuse the electrolytes flowing through the liquid supply slits 51*s* along the inner circumferential edge. Liquid discharge rectifying portions (not shown) may be formed at an inner circumferential edge of the liquid discharge-side piece 52. Each liquid discharge rectifying portion is used to correct the electrolyte flowing through the positive electrode 14 (or the negative electrode 15) and supply the electrolyte to the corresponding liquid discharge slit 52*s*.

The positive and negative electrolytes flow through each cell frame 3 as follows. The positive electrolyte flows from one of the liquid supply manifolds 51*m* through one of the liquid supply slits 51*s* that is formed in the liquid supply-side piece 51 and disposed on a first side (the front side in the drawing sheet) of the frame body 5 and is then supplied to the positive electrode 14. Then the positive electrolyte flows from the lower side of the positive electrode 14 toward the upper side as shown by arrows in the upper part of FIG. 3 and is discharged through one of the liquid discharge slits 52*s* formed in the liquid discharge-side piece 52 to one of the liquid discharge manifolds 52*m*. The negative electrolyte is supplied and discharged similarly to the positive electrolyte except that the negative electrolyte is supplied and discharged on a second side (the back side in the drawing sheet) of the frame body 5.

A ring-shaped sealing member 6 such as an O-ring or a flat packing is disposed in ring-shaped sealing grooves of adjacent frame bodies 5 to prevent leakage of the electrolytes from a battery cell 10.

Embodiment 1

Referring to FIGS. 1 to 5, the RF battery 1 according to embodiment 1 will be described. One feature of the RF battery 1 according to embodiment 1 is that the thickness x (μm) of each membrane and the compression ratio y (%) of positive electrode 14 and negative electrode 15 satisfy a specific relation. Its details will next be described.

[Membranes]

Each membrane 11 separates the corresponding positive and negative cells 12 and 13 from each other and allows hydrogen ions to pass therethrough between the cells 12 and 13. Each membrane 11 is interposed between the corresponding positive electrode 14 and the corresponding negative electrode 15, fastened by the end plates 22 of the cell stack 2 and the fastening mechanism 23, and sandwiched between the positive electrode 14 and the negative electrode 15. A first side of the membrane 11 is in direct contact with the positive electrode 14, and a second side is in direct contact with the negative electrode 15.

The type of membranes 11 may be an ion-exchange membrane such as a cation-exchange membrane or an anion-exchange membrane. Examples of the material of the membranes 11 include vinyl chloride, fluorine resin, polyethylene, and polypropylene. A well-known material may be used as the material of the membranes 11.

The shape of the membranes 11 may be the same as the outer shape of the cell frames 3 and is a rectangle in this example. The size of the membranes may be the same as the size of the cell frames 3. Passage holes (FIG. 3) are formed in the membrane 11 at positions facing the liquid supply and discharge manifolds 51*m* and 52*m*.

The smaller the thickness x of each membrane 11, the better because the internal resistance can be reduced. However, if the thickness x is excessively small, the membrane 11 is easily damaged, e.g., broken, because of contact (piercing) with the positive and negative electrodes 14 and 15, but this depends on the compression ratio y (%) of the positive and negative electrodes 14 and 15. Therefore, the thickness x of the membrane 11 and the compression ratio y (%) of the positive and negative electrodes 14 and 15 may satisfy a specific relation as described later in detail. The thickness x of the membrane 11 is the thickness of a portion sandwiched between the positive electrode 14 and the negative electrode 15 and is the thickness of this portion in the layered bodies assembled but not immersed in the electrolytes.

[Positive Electrodes-Negative Electrodes]

The electrolytes flow along the positive electrodes 14 and the negative electrodes 15, and a battery reaction thereby proceeds. Examples of the type of positive and negative electrodes 14 and 15 include carbon felt, carbon cloth, and carbon paper that are formed from carbon fibers. Carbon felt is produced by entangling carbon fibers into a felt form using, for example, a needle punching method or a hydroentangling method. Carbon cloth is produced by weaving carbon fibers into a woven fabric having a structure such as a plain weave structure, a sateen weave structure, or a twill weave structure. Carbon paper is a paper-like composite material formed of carbon fibers and carbon and produced, for example, by high-temperature heat treatment.

The positive and negative electrodes 14 and 15 are disposed inside the respective recesses 30 of the cell frames 3. The positive and negative electrodes 14 and 15 each have a rectangular shape conforming to the shape of the recesses 30 of the cell frames 3. The size of the positive and negative electrodes 14 and 15 may be substantially the same as the size of the recesses 30 of the cell frames 3. The thickness of the positive and negative electrodes 14 and 15 depends on their type and the thickness of the uncompressed positive and negative electrodes 14 and 15 before the layered bodies are assembled and is, for example, 0.3 mm or more and 3.0 mm or less. The thickness of each of the positive and negative electrodes 14 and 15 is the thickness of a portion of the each of the positive and negative electrodes 14 and 15 that is sandwiched between a membrane 11 and a bipolar plate 4 and is the thickness of this portion in the layered bodies assembled but not immersed in the electrolytes. The thickness of the uncompressed positive and negative electrodes 14 and 15 before assembly of the layered bodies depends on their type, specific gravity, basis weight, and area. The thickness is, for example, 0.5 mm or more and 5.0 mm or less when the positive and negative electrodes 14 and 15 are formed from carbon felt and is, for example, 0.3 mm or more and 1.0 mm or less when the positive and negative electrodes 14 and 15 are formed from carbon cloth or carbon paper.

The specific gravity of the positive and negative electrodes 14 and 15 may be, for example, 0.02 g/cm$^3$ or more and 0.5 g/cm$^3$ or less and may be 0.05 g/cm$^3$ or more and 0.4 g/cm$^3$ or less. When the specific gravity of the positive and negative electrodes 14 and 15 is 0.02 g/cm$^3$ or more, the internal resistance of the RF battery 1 can be easily reduced because the amount of a conductive component is high. When the specific gravity of the positive and negative electrodes 14 and 15 is 0.5 g/cm$^3$ or less, the repulsive force of the positive and negative electrodes 14 and 15 is not excessively high, so that the damage to the membrane 11 can be easily prevented.

[Relation Between Thickness x of Membranes and Compression Ratio y of Electrodes]

The type of positive and negative electrodes 14 and 15 may be, for example, carbon felt, carbon cloth, or carbon paper as described above, and the relation between the thickness x (μm) of each membrane 11 and the compression ratio y (%) of the positive and negative electrodes 14 and 15 may be appropriately selected mainly according to the type of positive and negative electrodes 14 and 15. The compression ratio y (%) is defined as {1−(the thickness during compression/the thickness before compression)}×100. The thickness during compression is the thickness in the layered bodies assembled but not immersed in the electrolytes. The thickness before compression is the thickness measured according to "JIS L 1913 (2010) Test Methods For Nonwovens" when the electrodes 14 and 15 are formed from carbon felt, is the thickness measured according to "JIS L 1096 (2010) Testing methods for woven and knitted fabrics" when the electrodes 14 and 15 are formed from carbon cloth, and is the thickness measured according to "JIS P 8118 (2014) Paper And Board—Determination Of Thickness, Density And Specific Volume" when the electrodes 14 and 15 are formed from carbon paper. When the positive and negative electrodes 14 and 15 are formed from carbon felt, the thickness of the membrane 11 is denoted by $x_A$, and the compression ratio of the positive and negative electrodes 14 and 15 is denoted by $y_A$. When the positive and negative electrodes 14 and 15 are formed from carbon cloth or carbon paper, the thickness of the membrane 11 is denoted by $x_B$, and the compression ratio of the positive and negative electrodes 14 and 15 is denoted by $y_B$.

(Electrodes Formed from Carbon Felt)

Figure 4:
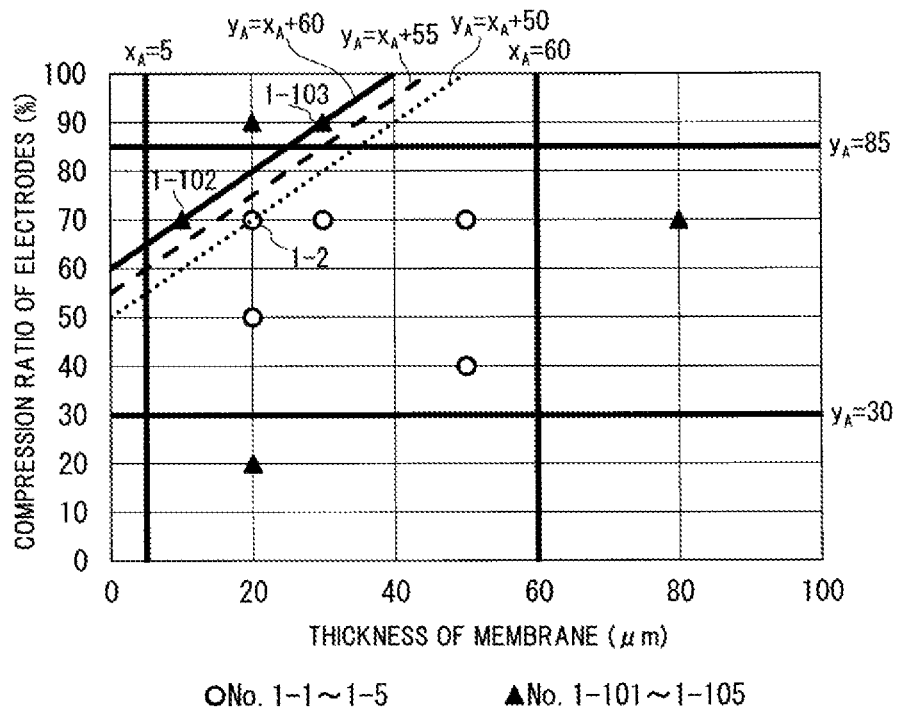
FIG. 4 is a graph showing the relation between the thickness of a membrane and the compression ratio of carbon felt electrodes.

As shown by solid lines in FIG. 4, the above relation may satisfy $y_A < x_A + 60$, $30 \leq y_A \leq 85$, and $5 \leq x_A \leq 60$. In this case, the thin membrane 11 is unlikely to be damaged without providing additional members.

When the compression ratio $y_A$ is 30 or more, the compression ratio of the positive and negative electrodes 14 and 15 is high, and the electrical conductivity of the positive and negative electrodes 14 and 15 can be increased. Therefore, the cell resistivity can be easily reduced. When the compression ratio $y_A$ is 85 or less, the positive and negative electrodes 14 and 15 are not compressed excessively, so that the damage to the membrane 11 due to the repulsive force of the electrodes 14 and 15 can be easily prevented. If the positive and negative electrodes 14 and 15 are compressed excessively, the fibers forming the positive and negative electrodes 14 and 15 may be bent, and the repulsive force may be thereby reduced. However, in the above case, the reduction in repulsive force can be prevented. Therefore, even when abnormal operation of the pumps 163 and 173 causes an excessive pressure to act on the membrane 11, the membrane 11 is less likely to be damaged.

When the thickness $x_A$ of the membrane 11 is 5 μm or more, the membrane 11 is not excessively thin, and the damage to the membrane 11 caused by contact with the positive and negative electrodes 14 and 15 can be easily prevented. Moreover, the membrane 11 can be easily produced and handled with ease. When the thickness x of the membrane 11 is 60 μm or less, the membrane 11 is thin, and the internal resistance of the RF battery 1 can be easily reduced.

Preferably, the above relation further satisfies $y_A \leq x_A + 55$ (shown by a broken line in FIG. 4). Particularly preferably, the above relation further satisfies $y_A \leq x_A + 50$ (shown by a dotted line in FIG. 4). Preferably, the compression ratio $y_A$ of the positive and negative electrodes 14 and 15 further satisfies $40 \leq y_A$. Preferably, the compression ratio $y_A$ of the positive and negative electrodes 14 and 15 further satisfies $y_A \leq 70$. The thickness $x_A$ of the membrane 11 further satisfies preferably $x_A \leq 50$ μm and particularly preferably $x_A \leq 40$ μm. Preferably, the thickness $x_A$ of the membrane 11 further satisfies 15 μm $\leq x_A$.

(Electrodes Formed from Carbon Cloth or Carbon Paper)

Figure 5:
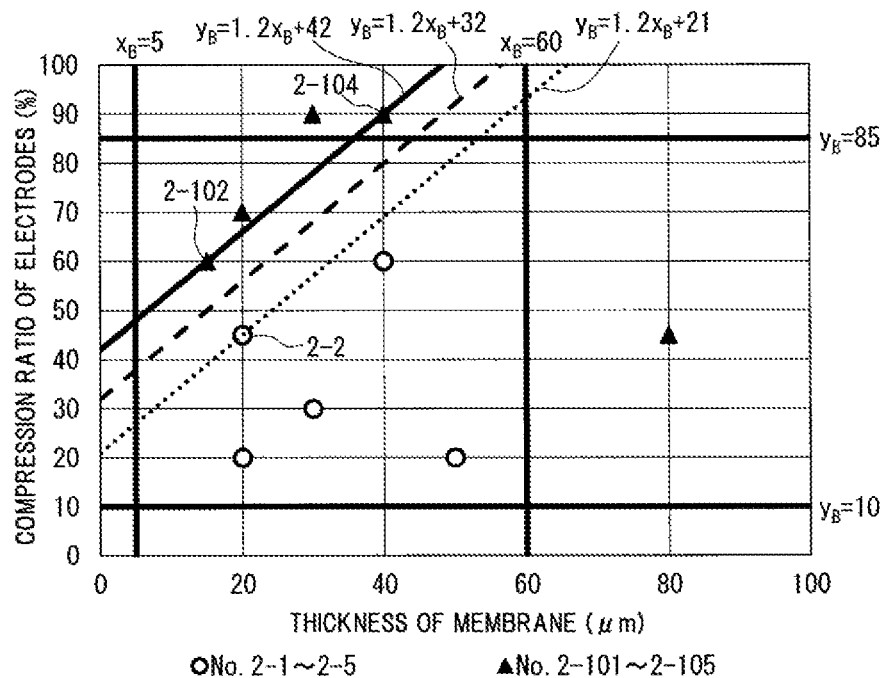
FIG. 5 is a graph showing the relation between the thickness of the membrane and the compression ratio of carbon cloth electrodes.

As shown by solid lines in FIG. 5, the above relation may satisfy $y_B < 1.2x_B + 42$, $10 \leq y_B \leq 85$, and $5 \leq x_B \leq 60$. In this case, as in the case of carbon felt, the thin membrane 11 is unlikely to be damaged without providing additional members.

The reasons for the upper and lower limits of the compression ratio $y_B$ and the reasons for the upper and lower limits of the thickness $x_B$ of the membrane are the same as those for the case of carbon felt. The above relation further satisfies preferably $y_B \leq 1.2x_B + 32$ (shown by a broken line in FIG. 5) and particularly preferably $y_B \leq 1.2x_B + 21$ (shown by a dotted line in FIG. 5). The compression ratio $y_B$ of the positive and negative electrodes 14 and 15 further satisfies preferably $20 \leq y_B$. The compression ratio $y_B$ of the positive and negative electrodes 14 and 15 further satisfies preferably $y_B \leq 60$. The thickness $x_B$ of the membrane 11 further satisfies preferably $x_B \leq 50$ μm and particularly preferably $x_B \leq 40$ μm. Preferably, the thickness $x_B$ of the membrane 11 further satisfies 15 μm $\leq x_B$.

[Applications]

The RF battery 1 in embodiment 1 can be used as a storage battery that is used for the purposes of stabilizing output variations in natural energy power generation such as solar photovoltaic power generation or wind power generation, storing excess electric power generated, and achieving load leveling. The RF battery 1 in embodiment 1 can be used as a storage battery placed in a general power station for the purposes of addressing momentary voltage drop and power failure and achieving load leveling.

[Operational Advantages]

In the RF battery 1 according to embodiment 1, the repulsive force of the compressed positive and negative electrodes 14 and 15 that acts on the membranes 11 is not excessively large, and the contact (piercing) of the membranes 11 with the positive and negative electrodes 14 and 15 can be easily prevented. Therefore, the thin membranes 11 are unlikely to be damaged without providing additional members.

<<Test Examples>>

Different types of electrodes were prepared. For each type, membranes with different thicknesses x (μm) were used, and different compression ratios y (%) of the positive and negative electrodes were used. The occurrence of piercing of the membrane with the electrodes, the occurrence of breakage of the membrane, and the cell resistivity ($\Omega \cdot cm^2$) were evaluated.

[Membrane-Electrodes]

Fluorine-based cation-exchange membranes were prepared as the membranes, and two types of electrodes, i.e., carbon felt electrodes and carbon cloth electrodes, were prepared as the positive and negative electrodes. The membranes and the electrodes each have a rectangular shape, and the size of the membranes is the same as the size of the electrodes. The thicknesses of the two types of membranes were changed as shown in Table 1. The specifications of the carbon felt and the carbon cloth are as follows.

(Carbon Felt)
 Thickness: 2 mm
 Specific gravity: 0.13 g/cm³
(Carbon Cloth)
 Thickness: 0.9 mm
 Specific gravity: 0.28 g/cm³

[Occurrence of Piercing]

The occurrence of piercing was evaluated by measuring a resistance value as follows. Positive and negative electrodes were disposed on the front and back sides of a membrane and pressed from both sides by two copper plates. The thickness of the membrane and the material and compression ratio of the positive and negative electrodes are as shown in Table 1. The compression ratio of the positive and negative electrodes is defined as y={1−(the thickness during compression/the thickness before compression)}×100. This also applies to the evaluation of the occurrence of breakage and the measurement of a cell resistance value described later. Terminals of a commercial tester (CDM-17D manufactured by CUSTOM corporation) were connected to the copper plates to measure the resistance value (Ω) between the terminals. When the resistance value was higher than 100Ω, it was considered that no piercing occurred, and a "Good" rating was assigned. When the resistance value was 100Ω or less, it was considered that piercing occurred, and a "Bad" rating was assigned. The results are shown in Table 1.

[Occurrence of Breakage]

Figure 6:
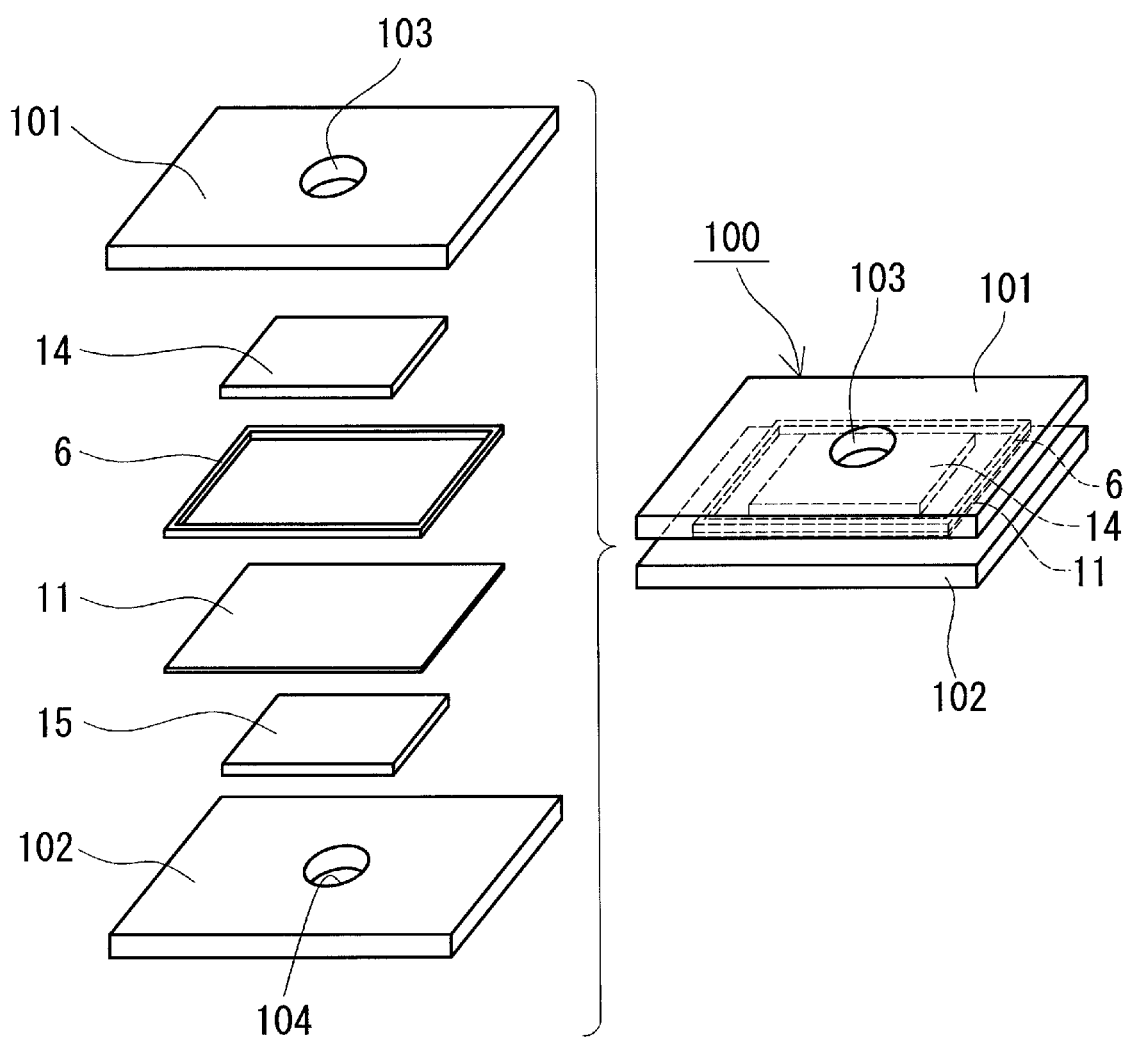
FIG. 6 is a schematic illustration showing the structure of a breakage test jig used in Test Examples.

Evaluation of the occurrence of breakage was performed using a breakage test jig 100 shown in FIG. 6, and gas was detected as follows. The breakage test jig 100 includes two compression plates 101 and 102. These compression plates 101 and 102 have respective through holes 103 and 104 formed at their centers so as to pass therethrough from the front side to the back side. The compression plates 101 and 102 have a rectangular shape, as do the positive and negative electrodes 14 and 15. The size of the compression plates 101 and 102 is larger than the size of the positive and negative electrodes 14 and 15. The positive and negative electrodes 14 and 15 were disposed on respective sides of a membrane 11, and a sealing member 6 surrounding the electrode 14 was disposed on one side of the membrane 11. The positive and negative electrodes 14 and 15 and the sealing member 6 were compressed from both sides of the electrodes 14 and 15 by the two compression plates 101 and 102. The thickness of the membrane 11 and the material and compression ratio of the positive and negative electrodes 14 and 15 are as shown in Table 1. Nitrogen gas with a prescribed gas pressure was introduced from the through hole 103 of the compression plate 101 with no electrolyte flow to thereby cause a prescribed pressure to act on the electrode 14, and the presence or absence of gas discharged from the through hole 104 of the compression plate 102 was detected. When no gas was detected at a gas pressure of 0.5 MPa, it was considered that no breakage occurred, and a "Good" rating was assigned. When the gas was detected at a gas pressure of 0.5 MPa, it was considered that breakage occurred, and a "Bad" rating was assigned. The results are shown in Table 1.

[Cell Resistivity]

A single-cell battery including electrodes with a reaction area of 9 cm² was produced, and its cell resistivity ($\Omega \cdot cm^2$) was measured as follows. The single-cell battery includes a battery element including one positive cell and one negative cell. A positive electrode and a negative electrode were disposed on respective sides of one membrane (ion-exchange membrane) and sandwiched between cell frames each including a bipolar plate. The thickness of the membrane and the material and compression ratio of the positive and negative electrodes areas shown in Table 1. A vanadium sulfate solution (vanadium concentration: 1.7 M (mol/L)) was used as the positive and negative electrolytes, and each of the sample single-cell batteries produced was charged and discharged using a constant current with a current density of 70 mA/cm². In this test, when a preset switching voltage was reached, charging was switched to discharging, and a plurality of charging/discharging cycles were performed. After the charging and discharging, the cell resistivity of each sample was determined. To determine the cell resistivity, the average voltage and average current in one cycle of the plurality of cycles were determined and used as the average voltage/the average current. The results are shown in Table 1. When the cell resistance value was 1.0 $\Omega \cdot cm^2$ or less, a "Good" rating was assigned. When the cell resistance value was more than 1.0 $\Omega \cdot cm^2$, a "Bad" rating was assigned.

TABLE 1

|  | Material forming electrodes | Compression ratio of electrodes (%) | Thickness of membrane (μm) | Piercing | Breakage | Cell resistivity ($\Omega \cdot cm^2$) |
|---|---|---|---|---|---|---|
| 1-1 | Carbon felt | 70 | 30 | Good | Good | 0.8 Good |
| 1-2 | Carbon felt | 70 | 20 | Good | Good | 0.7 Good |
| 1-3 | Carbon felt | 50 | 20 | Good | Good | 0.8 Good |
| 1-4 | Carbon felt | 40 | 50 | Good | Good | 1.0 Good |
| 1-5 | Carbon felt | 70 | 50 | Good | Good | 0.9 Good |
| 1-101 | Carbon felt | 90 | 20 | Bad | Bad | 0.6 Good |

TABLE 1-continued

|  | Material forming electrodes | Compression ratio of electrodes (%) | Thickness of membrane (μm) | Piercing | Breakage | Cell resistivity (Ω·cm$^2$) | |
|---|---|---|---|---|---|---|---|
| 1-102 | Carbon felt | 70 | 10 | Bad | Good | 0.6 | Good |
| 1-103 | Carbon felt | 90 | 30 | Bad | Bad | 0.7 | Good |
| 1-104 | Carbon felt | 70 | 80 | Good | Good | 1.2 | Bad |
| 1-105 | Carbon felt | 20 | 20 | Good | Good | 1.1 | Bad |
| 2-1 | Carbon cloth | 30 | 30 | Good | Good | 0.8 | Good |
| 2-2 | Carbon cloth | 45 | 20 | Good | Good | 0.7 | Good |
| 2-3 | Carbon cloth | 20 | 20 | Good | Good | 0.8 | Good |
| 2-4 | Carbon cloth | 20 | 50 | Good | Good | 1.0 | Good |
| 2-5 | Carbon cloth | 60 | 40 | Good | Good | 0.8 | Good |
| 2-101 | Carbon cloth | 70 | 20 | Bad | Good | 0.7 | Good |
| 2-102 | Carbon cloth | 60 | 15 | Bad | Good | 0.6 | Good |
| 2-103 | Carbon cloth | 90 | 30 | Bad | Bad | 0.7 | Good |
| 2-104 | Carbon cloth | 90 | 40 | Bad | Bad | 0.8 | Good |
| 2-105 | Carbon cloth | 45 | 80 | Good | Good | 1.1 | Bad |

As shown in Table 1, in each of sample Nos. 1-1 to 1-5 and 2-1 to 2-5, no piercing and no breakage were found to occur, and the cell resistivity was found to be low. However, in each of sample Nos. 1-101 to 1-105 and 2-101 to 2-105, at least one of piercing and breakage was found to occur, or the cell resistivity was high although no piercing and no breakage occurred.

The results for sample Nos. 1-1 to 1-5 and 1-101 to 1-105 in which carbon felt was used for the electrodes are shown in FIG. 4, and the results for sample Nos. 2-1 to 2-5 and 2-101 to 2-105 in which carbon cloth was used for the electrodes are shown in FIG. 5. The horizontal axis of each of the graphs in FIGS. 4 and 5 represents the thickness (μm) of the membrane, and the vertical axis represents the compression ratio (%) of the electrodes. The results for sample Nos. 1-1 to 1-5 are plotted as open circles in FIG. 4, and the results for sample Nos. 1-101 to 1-105 are plotted as solid triangles in FIG. 4. The results for sample Nos. 2-1 to 2-5 are plotted as open circles in FIG. 5, and the results for sample Nos. 2-101 to 2-105 are plotted as solid triangles in FIG. 5.

In the case where the carbon felt electrodes are used, a line connecting the point of sample No. 1-102 that is a sample with the highest electrode compression ratio and the thinnest membrane and the point of sample No. 1-103 that is a sample including the thickest membrane among samples with the highest electrode compression ratio is represented by $y_A = x_A + 60$ shown by a solid line in FIG. 4. From the viewpoint of the cell resistivity, the smaller the thickness $x_A$ of the membrane, the better. Moreover, the higher the compression ratio $y_A$ of the electrodes, the better. The thickness $x_A$ of the membrane is 5 μm or more and 60 μm or less, and the compression ratio $y_A$ of the electrodes is 30% or more and 85% or less. Therefore, when the carbon felt electrodes are used, it is preferable that the relation between the thickness $x_A$ of the membrane and the compression ratio $y_A$ of the electrodes satisfies $y_A < x_A + 60$, $30 \leq y_A \leq 85$, and $5 \leq x_A \leq 60$ as shown by solid lines in FIG. 4. As shown in FIG. 4, a line passing between $y_A = x_A + 60$ (solid line) and $y_A = x_A + 50$ (dotted line) and parallel to $y_A = x_A + 60$ (solid line) is represented by $y_A = x_A + 55$ shown by a broken line in FIG. 4. $y_A = x_A + 50$ (dotted line) is a straight line parallel to $y_A = x_A + 60$ (solid line) and passing through the point of sample No. 1-2 in Examples that is closest to $y_A = x_A + 60$. Therefore, the relation satisfies preferably $y_A \leq x_A + 55$ as shown by the broken line in FIG. 4 and satisfies preferably $y_A \leq x_A + 50$ as shown by the dotted line in FIG. 4.

Similarly, in the case where the carbon cloth electrodes are used, a line connecting the point of sample No. 2-102 that is a sample with the highest electrode compression ratio and the thinnest membrane and the point of sample No. 2-104 that is a sample including the thickest membrane among samples with the highest electrode compression ratio is represented by $y_B = 1.2 x_B + 42$ shown by a solid line in FIG. 5. The thickness $x_B$ of the membrane is 5 μm or more and 60 μm or less, and the compression ratio $y_B$ of the electrodes is 10% or more and 85% or less. Therefore, when the carbon cloth electrodes are used, it is preferable that the relation between the thickness $x_B$ of the membrane and the compression ratio $y_B$ of the electrodes satisfies $y_B < 1.2 x_B + 42$, $10 \leq y_B \leq 85$, and $5 \leq x_B \leq 60$ as shown by solid lines in FIG. 5. As shown in FIG. 5, a line passing between $y_B = 1.2 x_B + 42$ (solid line) and $y_B = 1.2 x_B + 21$ (dotted line) and parallel to $y_B = 1.2 x_B + 42$ is represented by $y_B = 1.2 x_B + 32$ shown by a broken line in FIG. 5. $y_B = 1.2 x_B + 21$ (dotted line) is a straight line parallel to $y_B = 1.2 x_B + 42$ (solid line) and passing through the point of sample No. 2-2 in Examples that is closest to $y_B = 1.2 x_B + 42$. Therefore, the relation satisfies preferably $y_B \leq 1.2 x_B + 32$ as shown by the broken line in FIG. 5 and satisfies preferably $y_B \leq 1.2 x_B + 21$ as shown by the dotted line in FIG. 5.

REFERENCE SIGNS LIST 1 redox flow battery (RF battery)
10 battery cell
11 membrane
12 positive cell
14 positive electrode
13 negative cell
15 negative electrode
10P positive electrolyte circulation mechanism
10N negative electrolyte circulation mechanism
16 positive electrolyte tank
17 negative electrolyte tank
161, 171 supply pipe
162, 172 discharge pipe
163, 173 pump
2 cell stack
20 substack
21 supply/drainage plate
22 end plate
23 fastening mechanism
3 cell frame 30 recess
4 bipolar plate
5 frame body
51 liquid supply-side piece
51m liquid supply manifold
51s liquid supply slit
52 liquid discharge-side piece
52m liquid discharge manifold
52s liquid discharge slit
6 sealing member
100 breakage test jig
101, 102 compression plate
103, 104 through hole

The invention claimed is:

1. A redox flow battery comprising:
a membrane; and
electrodes that are disposed in a compressed state on both sides of the membrane, directly contact the membrane, and sandwich the membrane,
wherein a thickness x (μm) of the membrane and a compression ratio y (%) of the electrodes satisfy the following relation A or B:
  (A) when the electrodes are formed from carbon felt, $y<x+60$, $30 \leq y \leq 85$, and $5 \leq x \leq 60$ hold;
  (B) when the electrodes are formed from carbon cloth or carbon paper, $y<1.2x+42$, $10 \leq y \leq 85$, and $5 \leq x \leq 60$ hold,
where y={1−(the thickness during compression/the thickness before compression)}×100.

2. The redox flow battery according to claim 1,
wherein the electrodes are formed from carbon felt, and
wherein the thickness x (μm) of the membrane satisfies $x \leq 50$.

3. The redox flow battery according to claim 2,
wherein the compression ratio y (%) of the electrodes satisfies $40 \leq y$.

4. The redox flow battery according to claim 1,
wherein the electrodes are formed from carbon cloth or carbon paper, and
wherein the thickness x (μm) of the membrane satisfies $x \leq 50$.

5. The redox flow battery according to claim 4,
wherein the compression ratio y (%) of the electrodes satisfies $20 \leq y$.

6. The redox flow battery according to claim 1,
wherein the electrodes have a specific gravity of 0.02 g/cm$^3$ or more and 0.5 g/cm$^3$ or less.

* * * * *